US005356687A

United States Patent [19]

Suenaga et al.

[11] Patent Number: 5,356,687

[45] Date of Patent: Oct. 18, 1994

[54] WINDOW FRAME FOR CONCRETE WALL PANEL

[75] Inventors: Tatsuo Suenaga; Hiroaki Nakagawa; Shin Terauchi; Takeo Kikuchi; Shinnosuke Aiba; Mikio Kobayashi; Yutaka Katsuta; Kenji Ago; Katsumi Kosuge; Yasuyuki Matsubara; Masato Tanaami; Shunichi Sugishita; Hideki Ikeda; Toshio Furuya, all of Tokyo; Shigeyuki Akihama, Kanagawa; Takahiro Arai, Saitama, all of Japan

[73] Assignees: Kajima Corporation; Kabushiki Kaisha F R C, both of Tokyo, Japan

[21] Appl. No.: 43,268

[22] Filed: Apr. 6, 1993

[30] Foreign Application Priority Data

Apr. 8, 1992 [JP] Japan .................................. 4-087155

[51] Int. Cl.[5] .......................... B32B 1/04; B32B 3/02

[52] U.S. Cl. ........................................ 428/70; 428/34; 428/81; 428/134; 52/206; 52/508

[58] Field of Search .................. 428/34, 192, 285, 81, 428/134; 52/217, 397, 400, 79, 659, 206, 508; 264/263

[56] References Cited

U.S. PATENT DOCUMENTS

| | | | |
|---|---|---|---|
| 3,707,813 | 1/1973 | Cymbrowitz et al. | 52/79 |
| 4,554,124 | 11/1985 | Sudragin | 264/263 |
| 4,565,840 | 1/1986 | Kobayashi et al. | 524/8 |
| 4,627,998 | 12/1986 | Akihama et al. | 428/285 |

FOREIGN PATENT DOCUMENTS

| | | | |
|---|---|---|---|
| 2427456 | 12/1979 | France | E06B 1/32 |
| 2518631 | 6/1983 | France | E06B 1/100 |
| 2539801 | 7/1984 | France | E06B 1/02 |
| 2632347 | 12/1989 | France | E06B 1/102 |
| 648079A5 | 12/1978 | Switzerland . | |
| 153389 | 11/1920 | United Kingdom . | |
| 1470841 | 3/1977 | United Kingdom | E06B 3/18 |

*Primary Examiner*—Patrick J. Ryan
*Assistant Examiner*—William A. Krynski
*Attorney, Agent, or Firm*—James H. Tilberry

[57] ABSTRACT

A combination concrete panel wall, concrete window frame, and concrete sash glazing frame. The sill, lintel, and jambs of the window frame are fiber-reinforced concrete extrusions which are cut to length and cemented together. The hardened frame is placed in a concrete panel molding frame to locate and define a window opening. The concrete panel wall grout is then poured and dovetail-type mortise and tenon joints are precast in the exterior faces of the window frame which abut the poured concrete wall panel plastic grout, to permanently mold and interlock the window frame to the panel wall. The sash members are also reinforced concrete extrusions which are cut to length, cemented together, and fitted about a window pane which is located in interior grooves in the sash members and then glazed. An elastoplastic seal interconnects the sash to the window frame to provide a condensation-resistant, water-tight, air-tight, heat and fire-resistant concrete wall closure.

5 Claims, 8 Drawing Sheets

WINDOW FRAME FOR CONCRETE WALL PANEL

BACKGROUND OF THE INVENTION

1. Field of the Invention

The field of invention relates to window frames, window sashes, and means to secure window sashes to window frames.

2. Description of the Prior Art

In order to set a glass in the opening of a wall panel, there is a generally known method for glazing by the steps of securing a window frame, often made of aluminum or steel, to the inner periphery of a wall panel opening and fitting and fixing the circumferential outermost edges of the glass into a glazing portion of the window frame. However, when using window frames made of aluminum or steel, there are problems of moisture condensation, in that dust mixes with the moisture to make the surrounding portion around the window glass dirty. Condensation also accelerates corrosion and rust, and the fireproofing and heat resisting properties of these prior art frames are comparatively inferior. Furthermore, there is a tendency to make these prior art window frames thinner to reduce weight, and thin, lightweight, window frames cause additional problems with respect to reduced waterproofing and thermal insulation. In addition, it is difficult to design a lightweight aluminum or steel window frame which appears to be solid and of high quality.

SUMMARY OF THE INVENTION

The invention comprises in combination a window frame made from extruded lengths of fiber-reinforced concrete, a sash frame made from extruded lengths of fiber-reinforced concrete, and a concrete wall panel which is cast in place about the window frame.

The window frame, in its preferred embodiment, is rectangular, and comprises a sill, a lintel, and a pair of jambs to support and secure the lintel to the sill. The outer faces of the sill, lintel, and jambs are extruded in the form of dovetail-type mortises and tenons. Each inner face of these members has extruded integral therewith a rectangular flange projecting normally from its adjacent inner face. A vertical face of each flange has formed therein a dovetail-type mortise sized to receive the tenon portion of a rubber-like elastoplastic seal.

The sash frame, in its preferred embodiment, is rectangular, and comprises four cut-to-length extruded members. Each member includes a window pane glazing groove in its inner face, a flat vertical back face, and a convexly curved front face to give the sash a solid, high quality, appearance. To reduce the weight of the sash, each member is cored and grooved.

The window frame-sash-wall combination is fabricated in the following manner. The window frame, sill, jambs, and lintel are cemented together and placed in the correct position within the wall panel mold frame. Concrete grout is then poured in the mold frame to surround the window frame. In so doing, the wall panel grout fills the mortises and surrounds tenons of the outer faces of the window frame to solidly bond the window frame into the panel wall. A window pane is located and secured in the glazing groove of the lower sash member. The side and top members are cemented together and the window pane is received within their respective glazing grooves and secured therein with suitable glazing grout. The final fabrication step is to cement the back face of the sash to the elastoplastic seal already secured in the dovetail-type mortises of the window frame members.

OBJECTS OF THE INVENTION

Accordingly, it is among the objects of the invention to provide a novel combination of wall panel, window frame, and window sash which minimizes moisture condensation; which is water-tight, air-tight, heat and fire resistant; which provides improved and novel means to secure the window frame to a wall opening; which provides improved and novel means to secure the novel glazing frame to the novel window frame; and which provides novel means to glaze a window pane in the glazing frame.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Reference is now made to the specification and drawings, in which like members are used to identify like parts of the invention.

Figure 1:
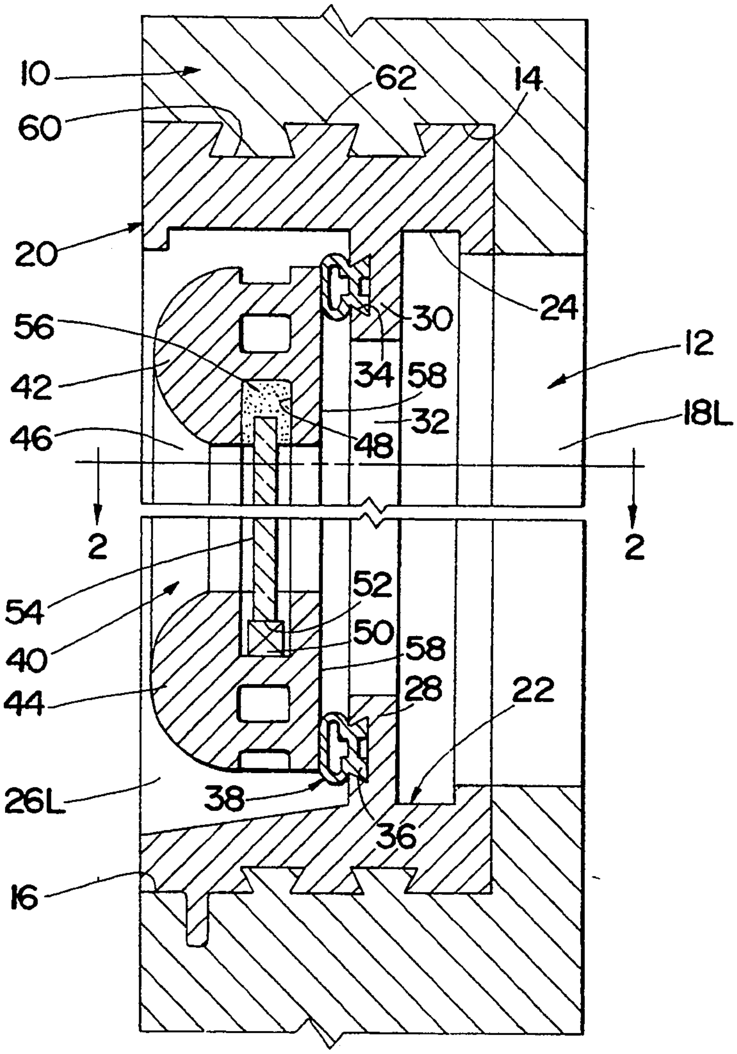
FIG. 1 is a fragmentary elevational view in section taken along the line 1—1 of FIG. 2, showing a preferred embodiment of the invention.

As shown in FIG. 1, an exterior concrete wall panel 10 is provided with a rectangular opening 12 having upper, lower, and two side faces 14, 16, 18L and 18R, respectively (18R not shown). A window frame 20 consisting of a sill 22, a lintel 24, and jambs 26L and 26R (26R not shown) is formed from fiber-reinforced concrete grout. Since the left and right jambs 26L and 26R are mirror images of each other, the description of the jambs will be limited to the left jamb 26L. Sill 22 includes an upstanding rectangular flange 28. Lintel 24 includes a downwardly projecting rectangular flange 30, and jambs 26 include laterally projecting flanges 32. Each flange includes a dovetail mortise 34 to receive therein the tenon portion 36 of an extruded, elastoplastic seal 38.

A glazing sash 40 comprises top member 42, bottom member 44, and left and right side members 46. Each member is cut to length from a linear extrusion of fiber-reinforced concrete, and includes a window pane receiving groove 48. In assembly, a window pane positioning block 50 is placed in the bottom of groove 48 of bottom member 44, the lower edge 52 of a window pane 54 is placed against the positioning block 50, and the top and side member grooves 48 are positioned to enclose the top and side edges of the window pane 54. The grooves 48 have sufficient depth so that the window pane 54 will not interfere with the positioning of the top member 42, bottom member 44, and side members 46 to form the rectangular glazing sash 40. The abutting surfaces of sash members 42, 44, and 46 are brought together and cemented. The grooves 48 are then filled with grout 56 which will position the window pane away from contact with the sash members 42, 44, and 46. After the cement which has bonded the sash members into a rigid rectangular sash has cured and the grout 56 has hardened, the back face 58 of the sash 44 is secured to the elastoplastic seal 38 by a compatible cementitious substance.

To assemble the combination of the panel wall 10, the window frame 20, and sash 40, first a panel wall mold (not shown) is prepared to define the top, bottom, side edges, and the thickness of the wall panel 10. Second, the window frame 20 is located by appropriate means within the panel wall mold where the window is intended to be. Although at this time the sash 40 could be preassembled with the window frame, to protect the window pane 54 from possible damage during the pouring of the panel wall 10, assembly of the sash 40 to the window frame 20 can be deferred until later.

After the window frame 20 is located and secured in the panel wall mold, the concrete panel wall 10 is poured and the concrete grout, while still fluid, fills around the window frame mortises 60 and tenons 62 which, when hardened, forms a solid waterproof interlock between the concrete panel wall 10 and the concrete window frame 20. The sash 40 can be joined to the window frame 20 at this time, or it can be assembled on the job site before or after the panel wall 10 has been erected.

Figure 3:
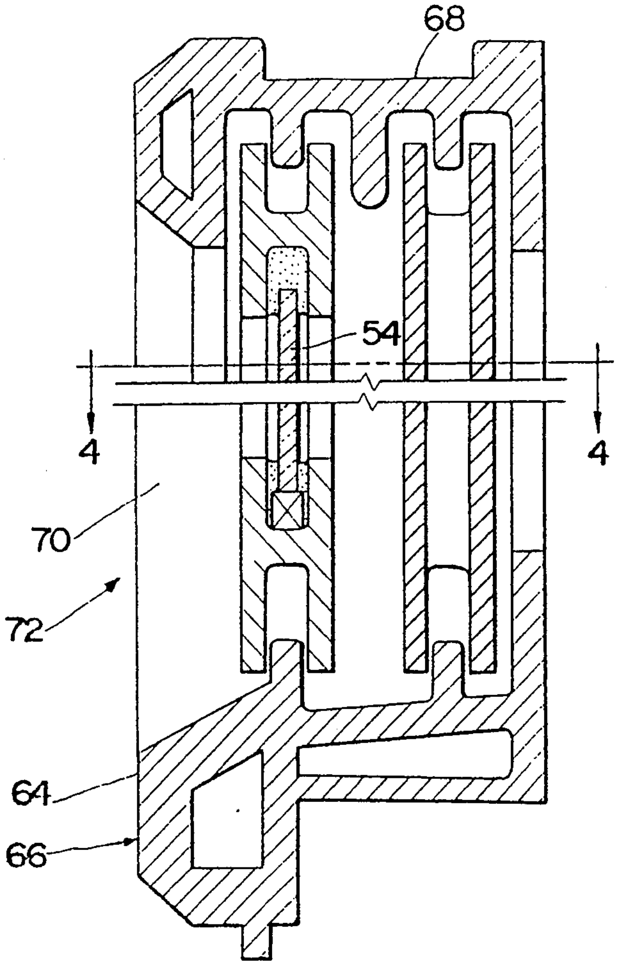
FIG. 3 is an elevational view in full section taken along the line 3—3 of FIG. 4 showing another preferred embodiment of the invention.
Figure 4:
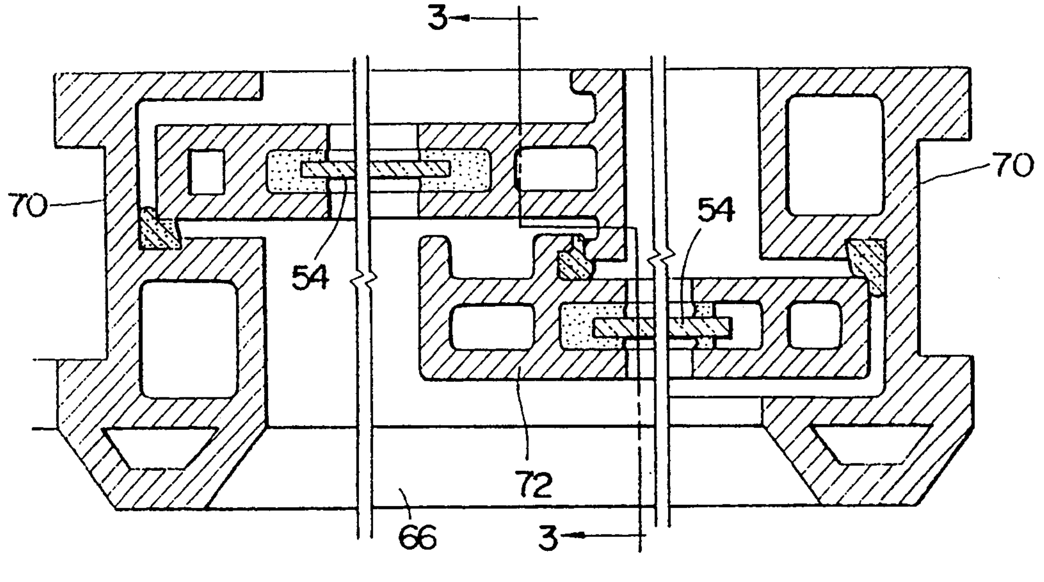
FIG. 4 is a cross-sectional plan view taken along the line 4—4 of FIG. 3 showing the preferred embodiment of FIG. 3.

FIGS. 3 and 4 show the structure of a double sliding window as another preferred embodiment of the present invention. Multi-faceted hollow portions 64 form the front faces of sill 66, lintel 68, and jambs 70, which comprise window frame 72.

Figure 2:
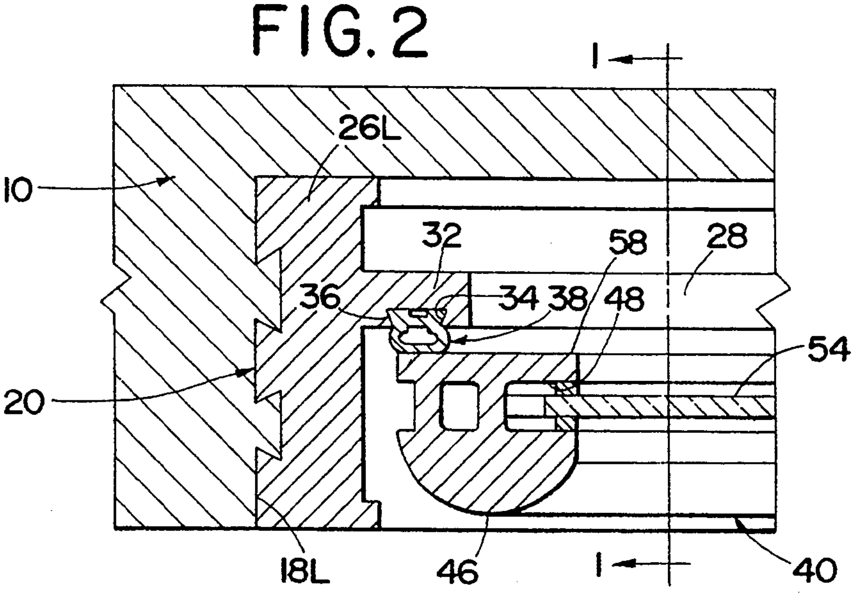
FIG. 2 is a fragmentary plan view in section taken along the line 2—2 of FIG. 1.
Figure 5:
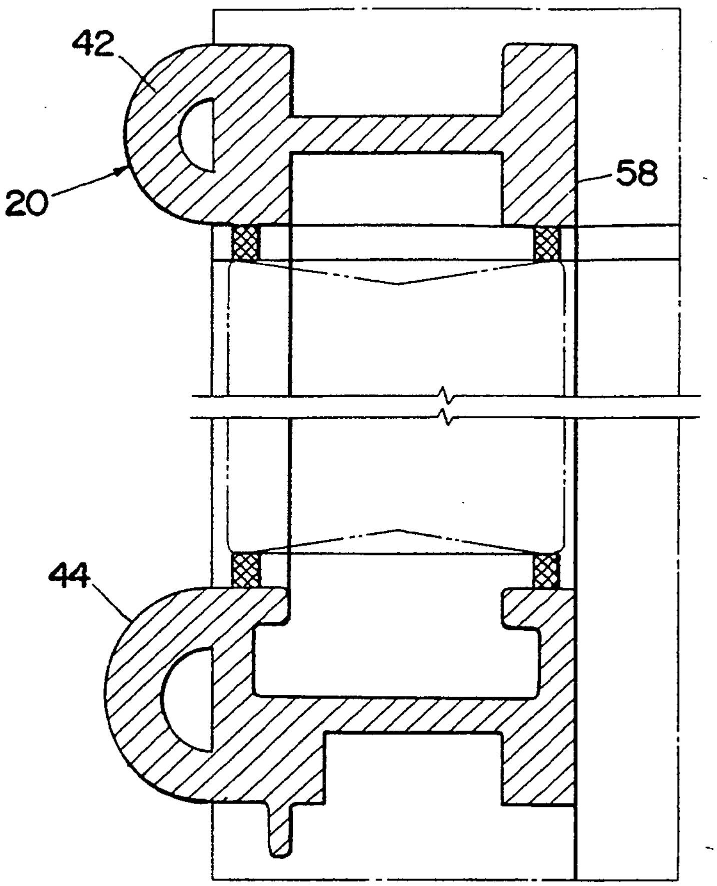
FIG. 5 is an elevational view in full section showing a further preferred embodiment of the invention.
Figure 6:
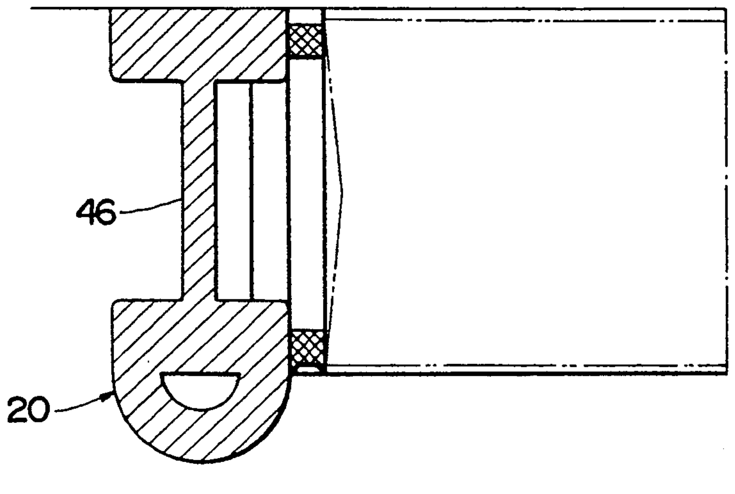
FIG. 6 is a fragmentary cross-sectional plan view showing the preferred embodiment of FIG. 5.
Figure 7:
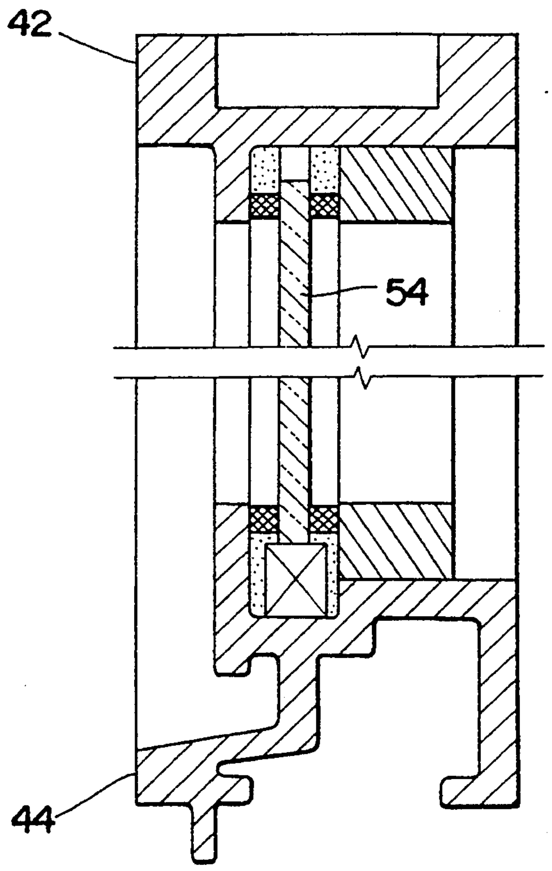
FIG. 7 is an elevational view in full section showing a still further preferred embodiment of the invention.
Figure 8:
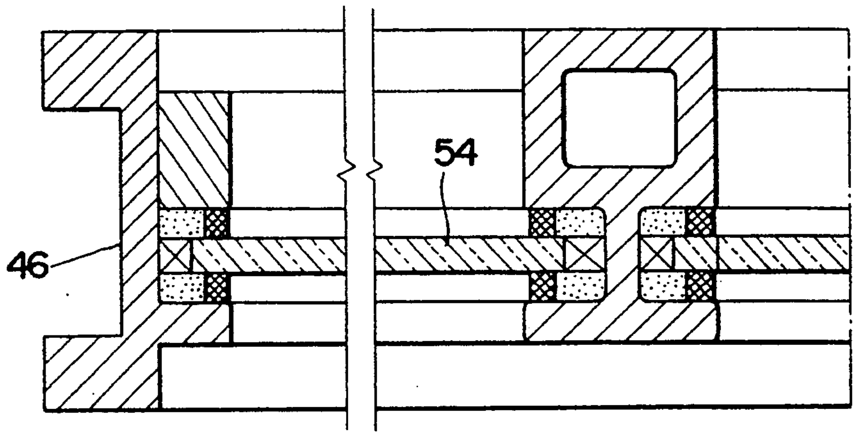
FIG. 8 is a cross-sectional plan view showing the preferred embodiment of FIG. 7.
Figure 9:
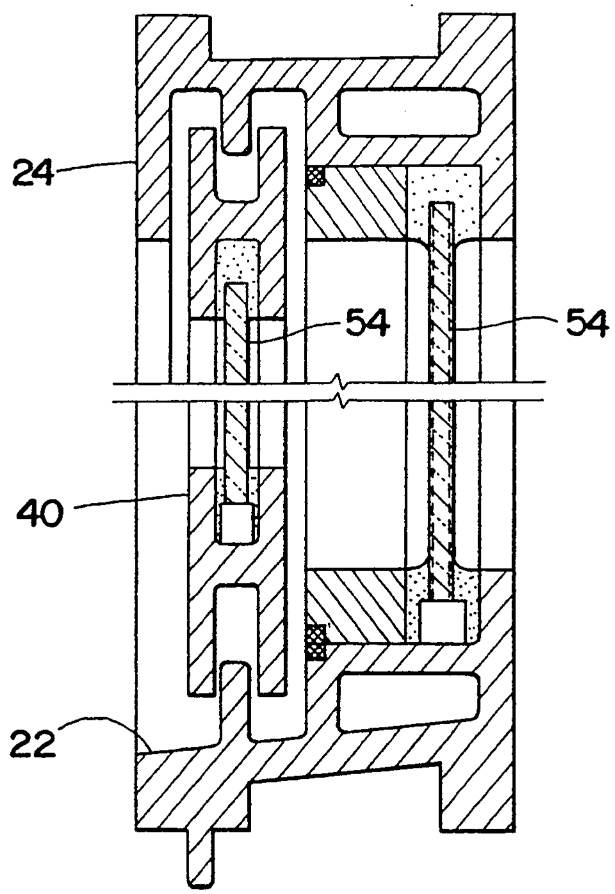
FIG. 9 is an elevational view in full section showing another preferred embodiment of the invention.
Figure 10:
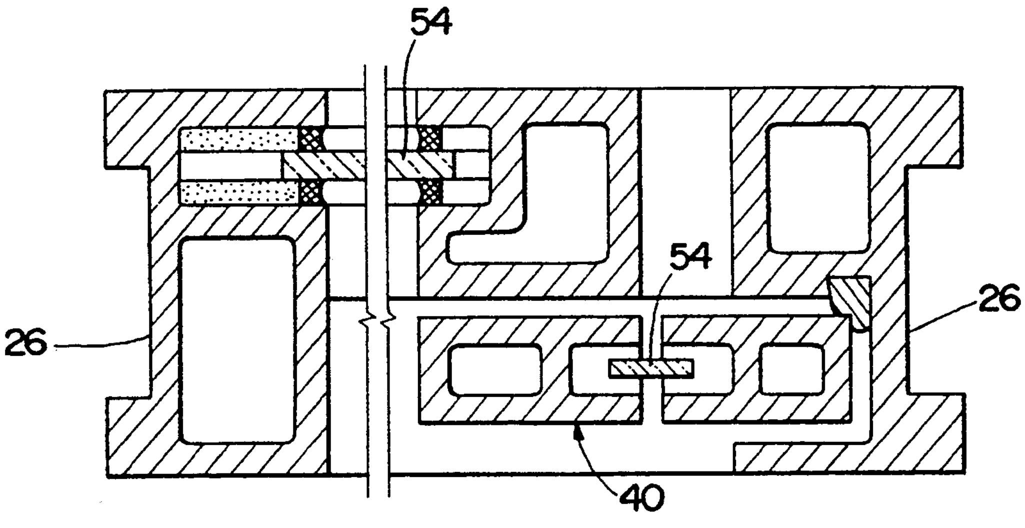
FIG. 10 is a cross-sectional plan view showing the preferred embodiment of FIG. 9.
Figure 11:
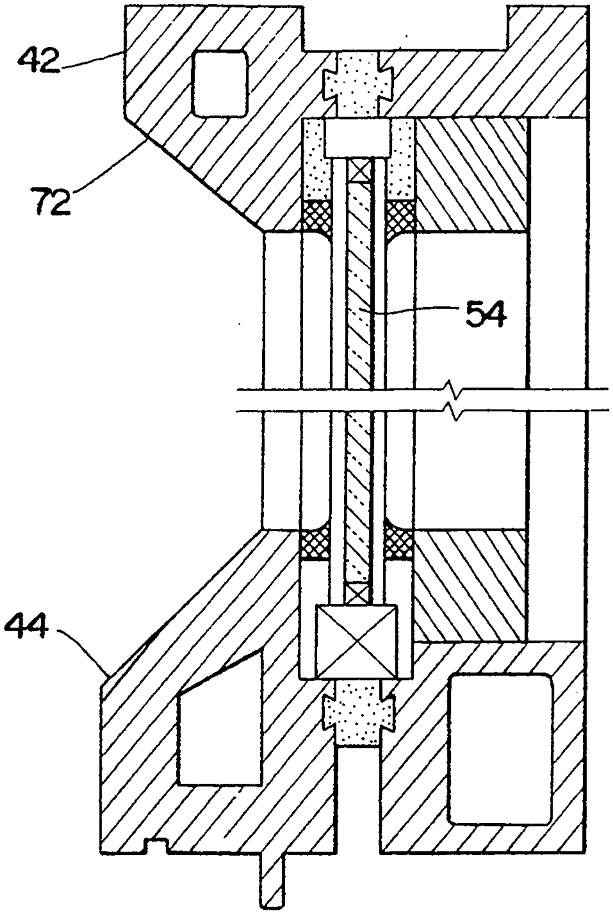
FIG. 11 is an elevational view in full section showing a yet further preferred embodiment of the invention.
Figure 12:
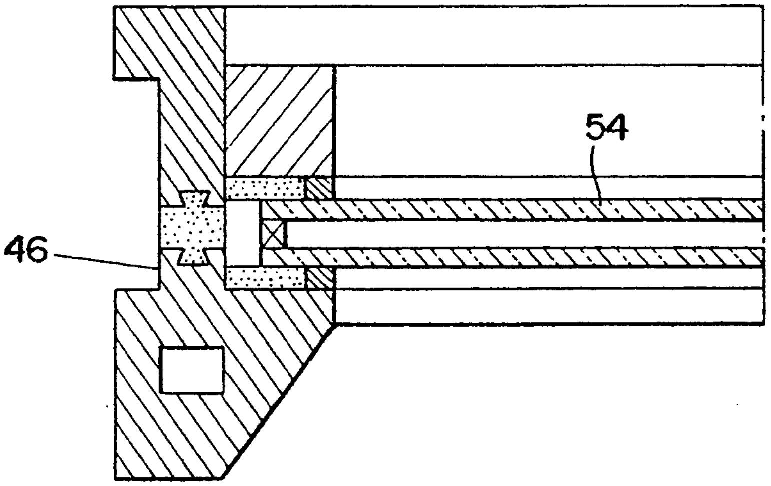
FIG. 12 is a fragmentary cross-sectional plan view showing the preferred embodiment of FIG. 11.
Figure 13:
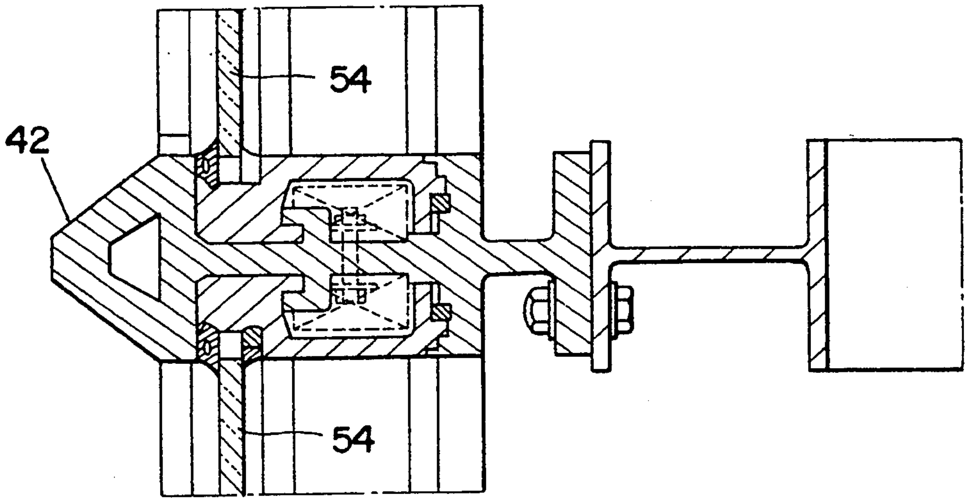
FIG. 13 is a fragmentary elevational view showing still another preferred embodiment of the invention.
Figure 14:
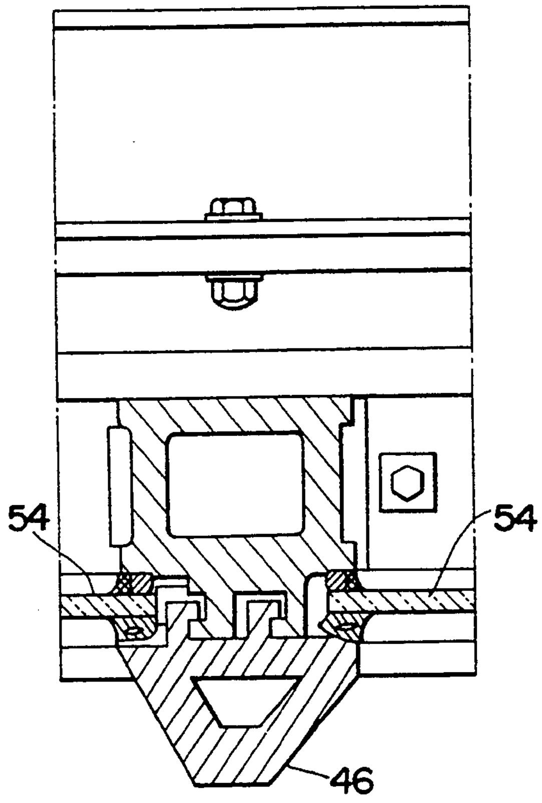
FIG. 14 is a fragmentary cross-sectional plan view showing the preferred embodiment of FIG. 13.
Figure 15:
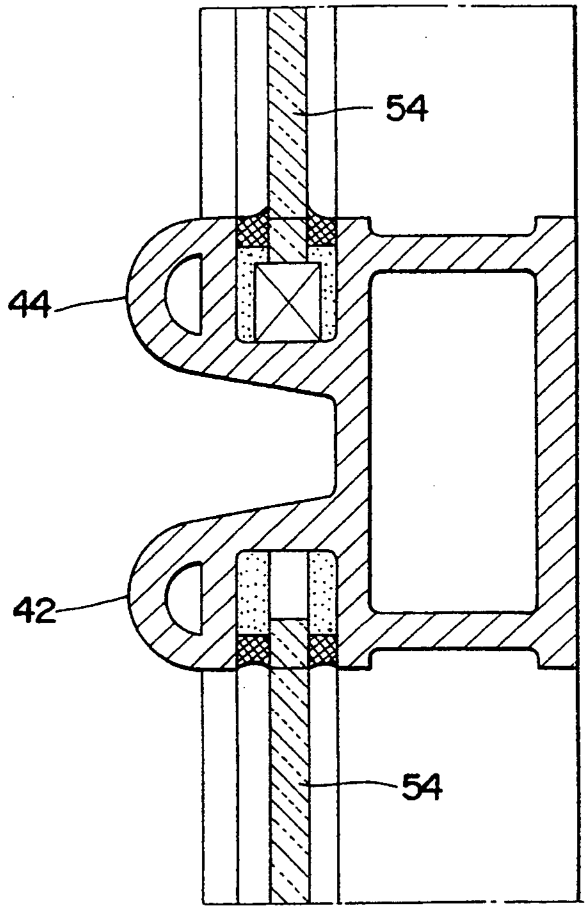
FIG. 15 is a fragmentary sectional view in elevation showing a yet further preferred embodiment of the invention.
Figure 16:
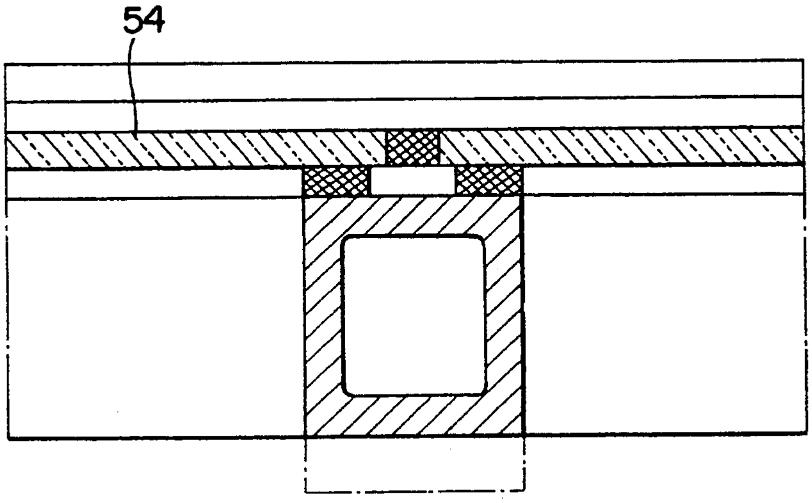
FIG. 16 is a fragmentary cross-sectional plan view showing the preferred embodiment of FIG. 15.

Further preferred embodiments of the invention are shown in FIGS. 5 through 16. FIGS. 5 and 6 show a structure of a glass block frame; FIGS. 7 and 8 show a structure of a fixed glass window sash; FIGS. 9 and 10 show a structure of a single sliding window; FIGS. 11 and 12 show a structure of a fixed glass window sash of a heat insulation type; FIG. 13 shows a structure of a curtain wall shown in fragmentary elevational view in section; FIG. 14 shows a curtain wall in fragmentary plan view in section; FIG. 15 shows, in sectional fragmentary elevational view a mullion type curtain wall; and FIG. 16 shows the same curtain wall in sectional fragmentary plan view. In each of these embodiments, the inventive concept of a combination concrete panel wall, concrete window frame, and concrete window sash is the same as described with respect to FIGS. 1 and 2. The combination provides a moisture condensation resistant, water-tight, air-tight, heat and fire resistant, rigid, interlock between the panel wall opening and the window frame.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

What is claimed is:

1. In a window closure for embedding in poured concrete prior to setting, the improvement comprising: an extruded fiber-reinforced concrete window frame sill; an extruded fiber-reinforced concrete window frame lintel; a pair of extruded fiber-reinforced window frame jambs, said sill, lintel, and pair of jambs each having outer and inner faces, dovetail-type mortise and tenon projections extending normally from said outer faces, and rectangular flange projections having front sides and back sides extending normally from said inner faces, including a longitudinally extending dovetail-type mortise cavity in the front side of each of said flanges, said window frame sill, window frame lintel, and pair of window frame jambs being cut to length and cemented together to form a window frame; an elastoplastic seal having a dovetail-type tenon portion fitted in said dovetail-type mortise cavities of said flanges; extruded concrete glazing sash top, bottom,and pair of side members having outer, inner, front, and back faces, including window pane glazing grooves in said inner faces; a window pane placed in said glazing grooves, said top, bottom, and pair of side members being cemented together to form a glazing sash, and said glazing sash being cemented to said elastoplastic seal, whereby said glazing sash and said window frame form said window closure.

2. The window closure of claim 1, wherein each said glazing sash member has a convex front face.

3. The window closure of claim 1, wherein each said glazing sash member is provided with weight reduction longitudinally extending cores and channels.

4. The window closure of claim 1, wherein said back faces of said glazing sash members are vertically planar and are cemented in abutting contact with said elastoplastic seal.

5. The window closure of claim 1, wherein said concrete is poured about said window frame outer faces to obtain interlocking engagement with said dovetail-type mortise and tenon projections of said window frames.

* * * * *